June 4, 1957  J. L. SELF  2,794,209
SHRIMP DEHEADING DEVICE
Filed Nov. 18, 1954
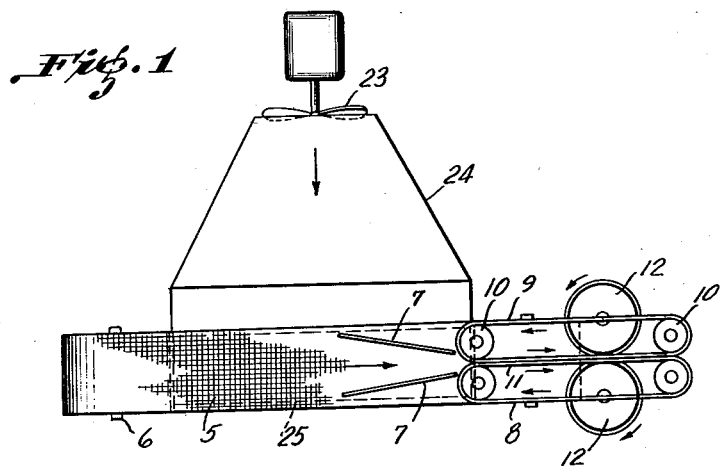
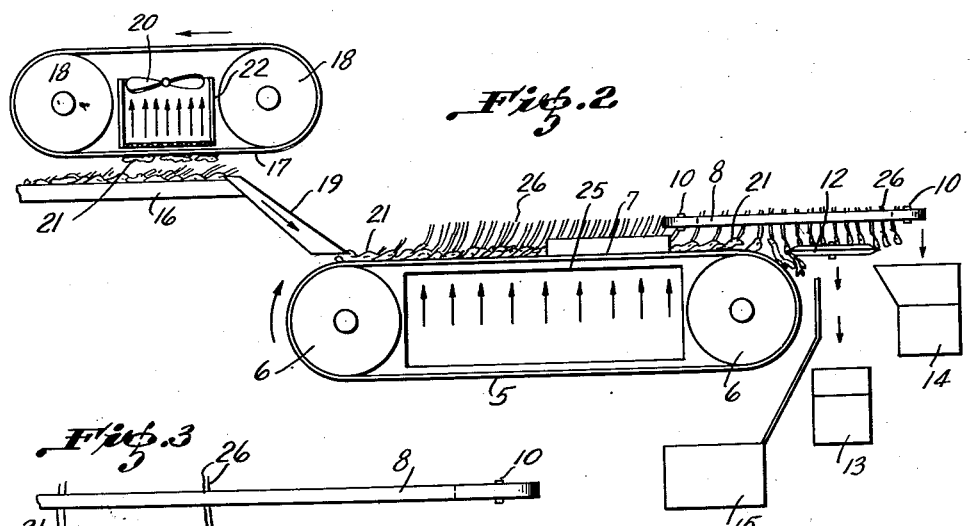
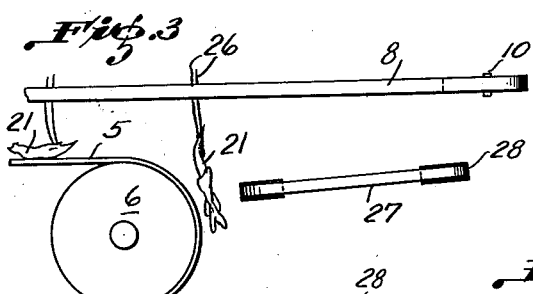
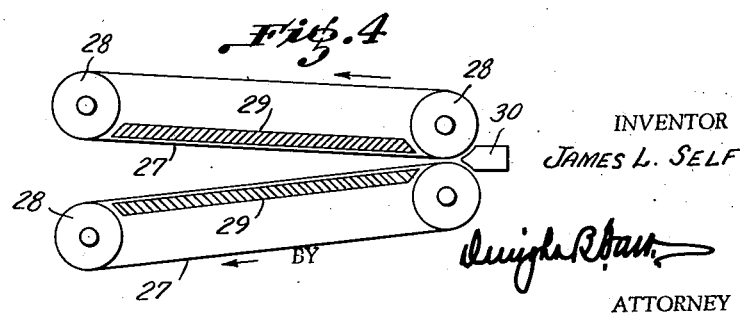
INVENTOR
JAMES L. SELF
BY
ATTORNEY United States Patent Office
2,794,209
Patented June 4, 1957

2,794,209

SHRIMP DEHEADING DEVICE

James Leland Self, Lake Charles, La.

Application November 18, 1954, Serial No. 469,769

4 Claims. (Cl. 17—2)

This invention is a method and apparatus for removing the heads from the bodies of shrimps.

In the preparation of shrimp for the market, it is necessary that the heads thereof be severed from the tail or edible part of the body, which operation heretofore has involved the disagreeable, tedious and costly operations by hand. It is the primary object of the invention to provide a machine which will be wholly automatic in its operation for bringing the shrimp one at a time into contact with a deheading device and depositing the tail portions in one compartment or receptacle and the undesirable head portions in another.

A further object of the invention is to provide the improved method and means of feeding the shrimp one at a time to a suitable carrier, removing the advancing shrimp one at a time and transposing them to a predetermined position and maintaining the shrimp thus positioned for engagement with means for severing the head from the shrimp body.

A further object of the invention is to provide an improved method and means for deheading shrimp which utilizes the antennae or feelers of the shrimp as a means for suspending the said shrimp in proper position to be engaged by a cutting or pinching off apparatus in separating the heads from the bodies and for depositing the bodies and heads in predetermined locations.

With the foregoing objects in view, together with others which will appear as the description proceeds, the invention consists in the novel method as well as the construction and arrangement of mechanical parts hereinafter fully described and claimed and portrayed by the drawings forming a part hereof and wherein:

Fig. 1 is a top plan view of an improved shrimp deheading device for carrying out the deheading process, Fig. 2 is a side elevation of the device as shown in Fig. 1 in association with an approved feeder of the shrimp to the deheading device, Fig. 3 is a fragmentary view illustrating a modification of the specific deheading means, and Fig. 4 is an enlarged plan view of the converging belt arrangement disclosed generally in the modification of Fig. 3.

In carrying out the invention, use is made of a travelling horizontally disposed belt, with means for feeding the shrimp one at a time to the belt, and which further includes means for lifting or elevating the antennae or feelers of the shrimp as they move with the belt to a position to be gripped by a travelling gripper device and suspended thereby while being brought into contact with a deheader properly located so as to sever the shrimp bodies from the heads in the proper area. Means are also provided for receiving such shrimp as may have failed to be engaged by the gripper in order that they may be refed to the device, as well as means for receiving the severed bodies, and further means for receiving the heads as they are finally discharged from the machine. The device of my invention, as will become obvious, is subject to variation in the mechanical structure for bringing about an entirely automatic severance of the heads from the bodies and the separations thereof, and it will be understood that variations from the structure here disclosed for the accomplishment of this overall result may be made without departing from the spirit of the invention.

As is well known, shrimps include an elongated body whose head is equipped with relatively long antennae or feelers, and my invention comprehends the suspension and support of the shrimp bodies by the feelers while at the same time moving them one at a time into contact with a deheading device properly positioned so as to sever the head from the body while thus suspended.

Referring now more particularly to the drawing, 5 indicates an endless foraminous belt, such as screen wire or other material passing over spaced rollers 6 which will be driven in any suitable manner to cause the belt to travel therearound. As shown in the drawings, the belt travels in a horizontal plane, and overlying the same are spaced guides 7 disposed in converging relationship toward the delivery end of the belt to bring about a funnelling action of shrimp that may be supported by the belt.

The gripper means for the shrimps comprises a pair of endless belts 8 and 9 which pass around spaced rollers 10 driven by any suitable means and with their operative flights 11 disposed in contact with one another in the longitudinal center of the conveyor belt 5 and at the converging ends of the guides 7.

In that form of the invention shown in Figs. 1 and 2 of the drawing, the severing or deheading device per se consists of a pair of cutting disks 12 with their meeting edges disposed a proper distance below and in the vertical plane of the meeting flights 11 of the gripper belts beyond the discharge end of the conveyor belt 5. These cutter or severing disks may be driven by any suitable means. Immediately below the meeting edges of the severing disks 12 a receptacle 13 is positioned to receive the desirable tail or body portions of the shrimps, while a second receptacle 14 is disposed beneath those rollers 10 most remote from the conveyor belt 5 to receive the heads as they are released by the gripper belts. A third receptacle 15 is located in advance of the tail or body receiving container 13 to receive such of the shrimps as may not have been brought into contact with the gripper belts 8, and it will be understood that these salvaged shrimps may be either again deposited upon the conveyor belt or may be treated by hand, as desired.

In Fig. 2 of the drawing, I have illustrated an approved device for feeding the shrimps one at a time to the conveyor belt 5. This feeder includes a horizontally disposed table or platform 16 upon which the shrimps to be deheaded are placed. Overlying the said table and in parallelism therewith is the lower flight of an endless belt 17 passing over suitably driven rollers 18, the said lower flight moving in the direction of the conveyor 5 at the receiving end thereof. The belt 17 is of foraminous material such as screen wire. The table or platform is disposed in a plane slightly above the conveyor belt 5, and a chute 19 enables shrimps to slide from the table 16 to the receiving end of the upper flight of the conveyor belt 5.

Arranged between the lower and upper flights of the feeder belt 17 is a blower or fan 20 to create an air pull in an upward direction, in sufficient force to bodily lift the shrimps, indicated at 21, against the lower flight of the screen belt 17. It will be observed that the channel 22 in which the fan 20 operates terminates at one end thereof immediately in advance of the upper end of the discharge chute 19, and the shrimps held by this partial vacuum action against the bottom of the screen belt 17 will be released as they pass beyond the zone of this pressure so as to drop into the chute 19 and to gravitate to the upper flight of the conveyor belt 5.

The conveyor is provided with a blower or fan 23 operating in a duct or casing 24 which has its open end disposed beneath the upper flight of the conveyor belt 5 as indicated at 25. This blower duct extends a substantial distance beneath the conveyor belt and has one end disposed adjacent to the receiving end of the gripper belts 8.

In operation, with the several belts moving at proper speeds, the cutting disks 12 adjusted properly and the fans in operation, the shrimps supported by the table or platform 16 are lifted by the partial vacuum in the chamber 22 into contact with the lower flight 17 of the feeder belt and are carried one at a time to the receiving end of the chute 19, being released from the action of the fan 20 immediately they pass one at a time beyond the side of the chamber 22. The shrimps are thus placed in single file upon the upper flight of the foraminous belt 5, and the air pressure in the chamber 24 generated by the fan 23 blows in an upward direction immediately beneath the upper flight of the conveyor belt, causing the antennae or feelers 26 to move vertically upward to the position shown in Fig. 2 and in the path of the meeting flights 11 of the belts 8. The converging guides 7 properly feed the shrimps with their feelers thus elevated to the meeting flights 11 of the belts 8, and these feelers are firmly gripped between these belts as they pass beyond the influence of air pressure from the outlet 25, whereupon the bodies of the shrimps will drop down into substantially vertical position with their neck portions in the path of the rotating cutting disks 12. Immediately the severing action takes place, the tail or desirable portions of the shrimps drop into the receptacle 13, but the heads, still supported by their feelers 26 pass on until the ends of the carrier belts are reached, whereupon they are released and gravitated to the receptacle 14. Should any of the shrimps escape engagement by the conveyor belts 8, they will drop into the receptacle 15, after which they may be either replaced upon the conveyor belt or treated by hand as desired.

In that form of the invention shown in Figs. 3 and 4 of the drawings, the means for severing the heads from the bodies of the shrimps involves a slight modification. In this form of the invention the cutting disks 12 are dispensed with, and substituted therefor are endless pincher belts indicated at 27. These belts travel around suitably driven rollers 28 arranged beneath the gripper belts 8. The adjacent surfaces of the belts 27 are arranged in converging relationship as shown particularly in Fig. 4, and each of the said adjacent flights is backed by a plate 29. These belts are designed to create a "pinching off" action on the vertically suspended shrimp, and the converging relationship illustrated brings about this "pinching off" action at the proper location on the shrimp body without regard to its size. As the shrimps may vary considerably in their transverse dimension, it is obvious that the shrimp heads will be severed at the proper location with the belts 27 slightly inclined from a true horizontal position as shown in Fig. 3, while being suspended by their feelers. As the shrimps are moved along toward the converging ends of the belts, the latter, substantially engaged with the backing plates 29, will pinch off the shrimp body from its head, whereupon the severed part will drop into the container 13 while the head passes between the rolls and is received in the container 14. A belt cleaner 30 may be arranged at the converging ends of the belts 27 to properly clear the belt surface of any adhering matter. By the provision of this means for deheading the shrimps, it is obvious that a presorting of the shrimps into size groups as might be required by the use of cutting disks 12, is obviated, as the converging belts 27 will act upon the oncoming suspended shrimp to sever the heads from the bodies of the same regardless of the lateral girth or dimension of the same.

I claim:

1. In a shrimp deheading device, a horizontally disposed conveyor belt, a shrimp receiving table beyond the receiving end of said belt and parallel therewith, a chute leading from said table to said belt, a feeder belt of foraminous material mounted above and in parallelism with said table, a fan above said feeder belt discharged in an upward direction to draw shrimp from said table into contact with said feeder belt, the receiving end of said chute coinciding with the end of the zone of influence of said fan whereby shrimps held by said feeder belt will be released therefrom above said chute, and shrimp deheading means at the discharge end of said conveyor belt.

2. In a shrimp deheading device, a horizontally disposed shrimp receiving table, an endless belt of foraminous material disposed above and in parallelism with said table with its lower flight disposed adjacent thereto, suction means above the said lower flight of said belt whereby shrimps upon said table will be drawn into contact with and held by the said lower flight of said belt, a downwardly inclined trough leading from said table and having one end thereof disposed at the end of the zone of influence of said suction means, a conveyor belt beyond said table and below the latter to receive shrimps from said chute, and shrimp deheading means disposed beyond the discharge end of said conveyor belt to receive and operate upon shrimps delivered thereto.

3. In a shrimp deheader, a horizontally travelling conveyor to support the shrimp, an elongated movable gripper means disposed in parallelism with and in part above said conveyor and adapted to move in linear direction therewith, air pressure means below said conveyor for moving the feelers of said shrimp upwardly and into engagement with said gripper, and a deheading device beyond the air pressure means and within the limits of the gripper to engage and sever the bodies from the heads of said shrimp while suspended from said gripper means by said feelers.

4. In a shrimp deheader, a horizontally disposed movable conveyor having receiving and discharge ends and formed of foraminous material to support the shrimp, an elongated gripper means above and parallel with said conveyor having its forward end overlying and disposed inwardly of said discharge end of said conveyor and movable in the same direction therewith, the opposite end of said gripper means disposed beyond said discharge end, air pressure means below said conveyor and said forward end of said gripper means for moving the feelers of said shrimp upwardly and into engagement with said gripper means, and a deheading device beyond the discharge end of said conveyor to engage and sever the bodies from the heads of said shrimp while suspended by said feelers.

References Cited in the file of this patent

UNITED STATES PATENTS

| 2,491,778 | Smith | Dec. 20, 1949 |
| 2,534,767 | Greiner et al. | Dec. 19, 1950 |
| 2,546,414 | Abbott | Mar. 27, 1951 |
| 2,553,519 | Lenz | May 15, 1951 |
| 2,663,897 | Greiner et al. | Dec. 29, 1953 |
| 2,663,900 | Greiner et al. | Dec. 29, 1953 |

FOREIGN PATENTS

| 629,943 | Great Britain | Sept. 30, 1949 |